(12) United States Patent
Chen et al.

(10) Patent No.: US 12,067,417 B2
(45) Date of Patent: Aug. 20, 2024

(54) AUTOMATIC CONTAINER MIGRATION SYSTEM

(71) Applicant: International Business Machines Corporation, Armonk, NY (US)

(72) Inventors: Yao Chen, Beijing (CN); Hai Bo Zou, Beijing (CN); De Shuo Kong, Beijing (CN); Zheng Jie, Beijing (CN)

(73) Assignee: International Business Machines Corporation, Armonk, NY (US)

(*) Notice: Subject to any disclaimer, the term of this patent is extended or adjusted under 35 U.S.C. 154(b) by 617 days.

(21) Appl. No.: 17/301,856

(22) Filed: Apr. 16, 2021

(65) Prior Publication Data
US 2022/0334870 A1    Oct. 20, 2022

(51) Int. Cl.
*G06F 9/46* (2006.01)
*G06F 9/48* (2006.01)

(52) U.S. Cl.
CPC .......... *G06F 9/4856* (2013.01); *G06F 9/4881* (2013.01)

(58) Field of Classification Search
CPC .................................................. G06F 9/4856
USPC ........................................................ 718/102
See application file for complete search history.

(56) References Cited

U.S. PATENT DOCUMENTS

| | | | | |
|---|---|---|---|---|
| 9,888,067 B1* | 2/2018 | Yemini | ............... | H04L 67/1008 |
| 10,346,775 B1* | 7/2019 | Xu | ........................ | G06F 9/5027 |
| 10,601,679 B2* | 3/2020 | Lynar | ................. | H04L 67/1008 |
| 10,671,953 B1* | 6/2020 | Xu | .......................... | H04L 67/10 |
| 2012/0089726 A1* | 4/2012 | Doddavula | ............. | H04L 67/34 |
| | | | | 709/224 |
| 2013/0326506 A1* | 12/2013 | McGrath | ................. | H04L 47/70 |
| | | | | 718/1 |
| 2013/0326507 A1* | 12/2013 | McGrath | ............... | G06F 9/4856 |
| | | | | 718/1 |
| 2016/0034293 A1* | 2/2016 | Cao | ........................ | G06F 9/5083 |
| | | | | 718/1 |

(Continued)

FOREIGN PATENT DOCUMENTS

| CN | 104010028 A | 8/2014 |
|---|---|---|
| CN | 109871384 A | 6/2019 |

(Continued)

OTHER PUBLICATIONS

China International Search Report and Written Opinion dated Jul. 11, 2022, regarding Application No. PCT/CN2022/086829, 9 pages.

(Continued)

*Primary Examiner* — Mehran Kamran
(74) *Attorney, Agent, or Firm* — Yee & Associates, P.C.

(57) ABSTRACT

A method, apparatus, system, and computer program product for container migration. A set of processors operates to identify a set of containers for a set of applications for a migration using a set of application performance metrics. The set of processors operates to create a set of tasks following a migration strategy to move the set of containers for the set of applications identified for the migration from a set of current physical host computers to a set of target physical host computers using the set of application performance metrics. The set of processors operates to move the set of containers for the set of applications from the set of current physical host computers to the set of target physical host computers using the set of tasks following the migration strategy.

21 Claims, 9 Drawing Sheets

(56) References Cited

U.S. PATENT DOCUMENTS

| | | | | |
|---|---|---|---|---|
| 2016/0217050 A1* | 7/2016 | Grimm | ................ | G06F 11/203 |
| 2016/0330277 A1* | 11/2016 | Jain | .................... | H04L 67/1095 |
| 2016/0378532 A1* | 12/2016 | Vincent | ................ | G06F 9/5088 |
| | | | | 718/1 |
| 2017/0060609 A1* | 3/2017 | Cropper | ................ | G06F 9/5077 |
| 2017/0063722 A1* | 3/2017 | Cropper | .................. | G06F 9/50 |
| 2018/0349168 A1* | 12/2018 | Ahmed | .............. | G06F 11/3006 |
| 2019/0199601 A1* | 6/2019 | Lynar | .................... | H04L 43/08 |
| 2020/0117494 A1* | 4/2020 | Cortez | ............... | G06F 9/45558 |
| 2021/0042151 A1* | 2/2021 | Müller | ................ | G06F 9/4856 |
| 2022/0334870 A1* | 10/2022 | Chen | .................... | G06F 9/4881 |

FOREIGN PATENT DOCUMENTS

| | | |
|---|---|---|
| CN | 110134495 A | 8/2019 |
| CN | 111061432 A | 4/2020 |
| CN | 111190688 A | 5/2020 |
| CN | 111897654 A | 11/2020 |

OTHER PUBLICATIONS

Vukovic et al., "Cloud migration using automated planning," 2016 IEEE/IFIP Network Operations and Management Symposium, Istanbul, Turkey, 2016, pp. 96-103, doi: 10.1109/NOMS.2016.7502801.
Kolodyuk, "Live Containers Migration Across Data Centers: AWS and Azure Integration," Jelastic Blog, Dec. 14, 2015, 10 pages, https://jelastic.com/blog/live-containers-migration-across-data-centers-aws-and-azure-integration/.

\* cited by examiner

US 12,067,417 B2

AUTOMATIC CONTAINER MIGRATION SYSTEM

BACKGROUND

1. Field

The disclosure relates generally to an improved computer system and, more specifically, to a method, apparatus, system, and computer program product for automatic container migration.

2. Description of the Related Art

Cloud computing environments enable delivering various applications as on-demand services. This type of environment is scalable enabling organizations to easily increase and decrease access to applications. An organization using a cloud computing environment can avoid or reduce the upfront costs for the information technology infrastructure needed to access various applications.

One challenge with cloud computing environments is providing applications as services with a desired or expected quality of service (QoS) level spelled out in service level agreements (SLAs). The quality of service level may include characteristics such as latency, scalability, availability, or other characteristics.

Containers can be used in cloud computing environments to provide application services. Containers are units of software in which one or more containers can form an application. Containers can provide portability and scalability with respect to application services used by organizations. Containers can be moved between a cloud or within clouds to shift workloads among different physical server computers.

Resource availability can reduce the performance of containers for applications. Containers may compete for resources in the same physical server computer. For example, containers may request to execute storage tasks at the same time. As a result, congestion or bottlenecks can occur with respect to input and output operations. Currently, managing deployment and movement of containers can be more difficult than desired.

Therefore, it would be desirable to have a method and apparatus that take into account at least some of the issues discussed above, as well as other possible issues. For example, it would be desirable to have a method and apparatus that overcome a technical problem with migrating containers to increase the performance of applications.

SUMMARY

According to one embodiment of the present invention, a method for migrating containers is provided. A set of containers for a set of applications for a migration is identified by a set of processors using a set of application performance metrics. A set of tasks following a migration strategy to move the set of containers for the set of applications identified for the migration from a set of current physical host computers to a set of target physical host computers is created by the set of processors using the set of application performance metrics. The set of containers for the set of applications is moved by the set of processors from the set of current physical host computers to the set of target physical host computers using the set of tasks following the migration strategy.

According to another embodiment of the present invention, a container management system comprises a set of processors that operates to identify a set of containers for a set of applications for a migration using a set of application performance metrics; create a set of tasks following a migration strategy to move the set of containers for the set of applications identified for the migration from a set of current physical host computers to a set of target physical host computers using the set of application performance metrics; and move the set of containers for the set of applications from the set of current physical host computers to the set of target physical host computers using the set of tasks following the migration strategy.

According to yet another embodiment of the present invention, a computer program product for container migration comprises a computer-readable-storage media with first program code, second program code, and third program code stored on the computer-readable storage media. The first program code is executable by a computer system to cause the computer system to identify a set of containers for a set of applications for a migration using a set of application performance metrics. The second program code is executable by the computer to cause the computer system to create a set of tasks following a migration strategy to move the set of containers for the set of applications identified for the migration from a set of current physical host computers to a set of target physical host computers using the set of application performance metrics. The third program code is executable by the computer system to cause the computer system to move the set of containers for the set of applications from the set of current physical host computers to the set of target physical host computers using the set of tasks following the migration strategy.

DETAILED DESCRIPTION

Figure 1:
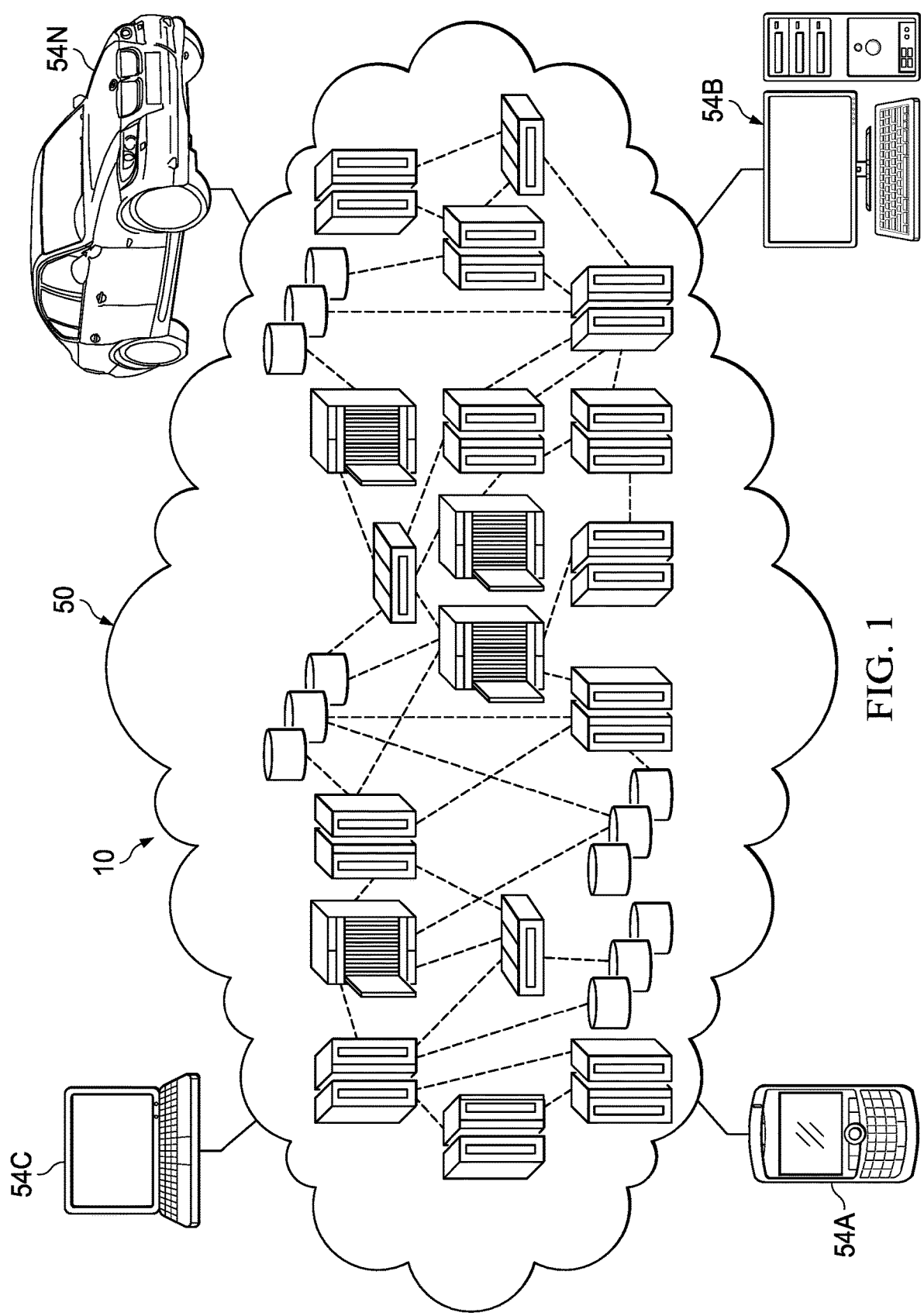
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media)

having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that a container for containers for an application can be migrated within a cloud in response to degradation and application performance. The illustrative embodiments recognize and take into account that performance metrics for the containers can be collected and analyzed and that the configuration of the containers can be changed to improve the performance of the containers. The illustrative embodiments recognize and take into account that the configuration change can comprise a change in resource allocation on a current server computer, moving a container or containers for an application to another server computer with greater resource availability, or a combination thereof.

The illustrative embodiments recognize and take into account that current techniques for migrating containers focus on the performance of the containers. The illustrative embodiments recognize and take into account that although this type of analysis may provide some improvement in the performance of applications, this analysis does not take into account that movement of a container for one application may improve the performance of that container, but may result in an imbalance in the use of resources for multiple applications in a computer system having a computing environment such as a cloud computing environment.

The illustrative embodiments recognize and take into account that focusing on container performance in migrating containers can result in underutilization of resources in the computing environment. The illustrative embodiments also recognize and take into account that this manner of improving performance does not take into account changing application demands. As a result, the allocation of resources may be greater than needed resulting in unused resources. The illustrative embodiments also recognize and take into account that this manner of improving performance does not take into account changing application demands. As a result, the illustrative embodiments recognize and take account that the allocation of resources may be greater than needed, resulting in unused resources.

The illustrative embodiments also recognize and take into account that examining patterns of performance metrics for applications may provide an improved strategy in contrast to focusing on patterns of performance metrics for individual containers. Further, the illustrative embodiments recognize and take into account that increased performance of applications can occur with continuous and dynamic monitoring of application performance metrics and performing automatic migrations of containers based on the analysis of these metrics.

Thus, the illustrative embodiments provide a method, apparatus, system, and computer program product for automatic container migration. In one illustrative example, a process automatically migrates containers in a computer system. A set of containers for a set of applications for a migration is identified by a set of processors using a set of application performance metrics. A set of tasks following a migration strategy to move the set of containers for the set of applications identified for the migration from a set of current physical host computers to a set of target physical host computers is created by the set of processors using the set of application performance metrics. The set of containers for the set of applications is moved by the set of processors from the set of current physical host computers to the set of target physical host computers using the set of tasks following the migration strategy.

The different steps for migrating the containers can be performed automatically on a continuous basis. Further, the steps can be performed dynamically during the operation of applications in a computing environment such as a cloud computing environment.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 in cloud computing environment 50 can communicate with any type of computerized device over any type of network and/or network addressable connection (e.g., using a web browser).

Figure 2:
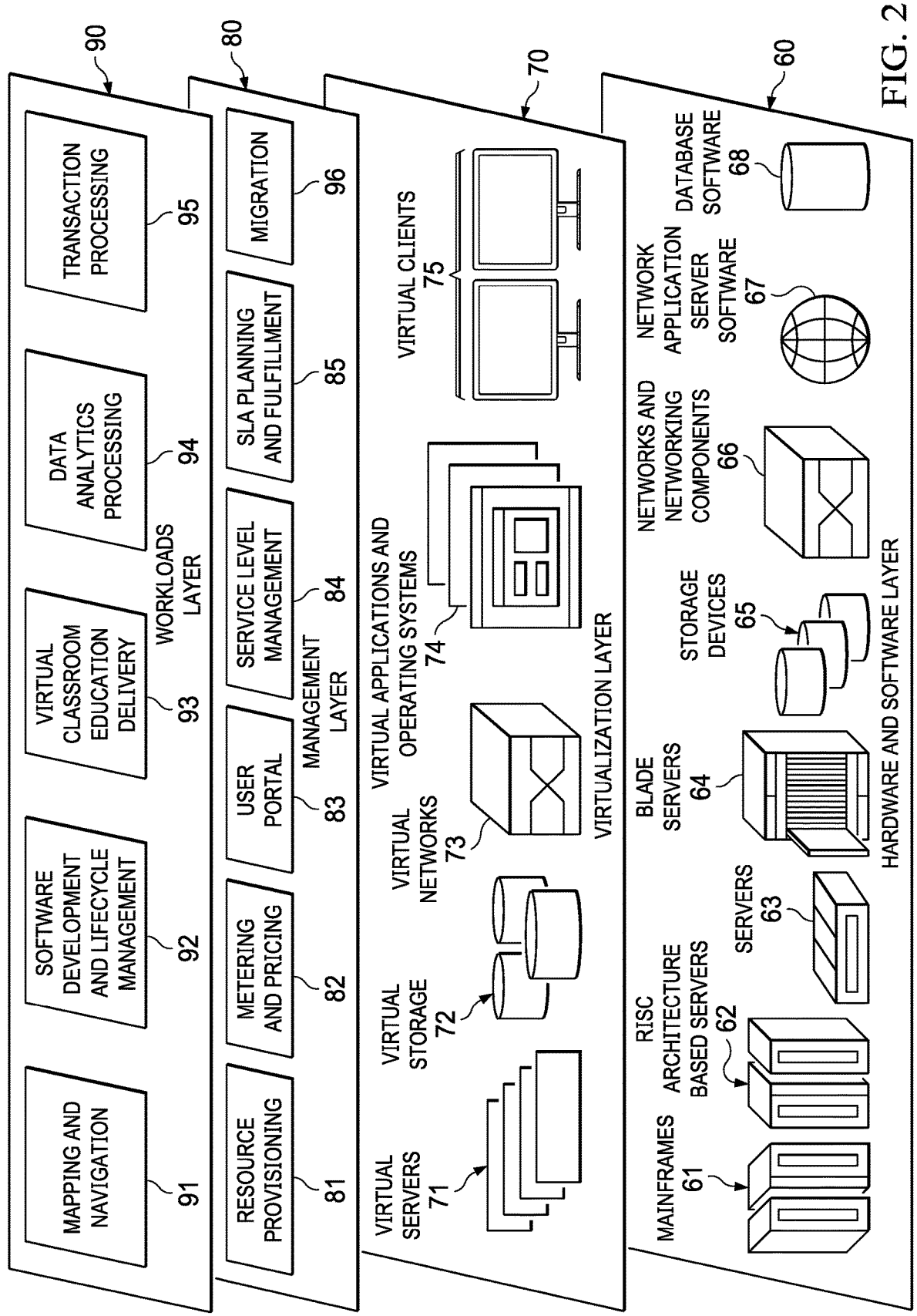
FIG. 2 is a set of functional abstraction layers provided by cloud computing environment 50 in FIG. 1 is shown.

Referring now to FIG. 2, a set of functional abstraction layers provided by cloud computing environment 50 in FIG. 1 is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

In this illustrative example, management layer 80 can also include migration 96. Migration 96 provides a service for migrating containers for applications in clouds in cloud computing environment 50 in FIG. 1. In the illustrative example, migration 96 can provide for automatic migration of containers for applications between physical host servers to increase performance of the applications, increase the use of resources, or both increase the performance of the applications and increase the use of resources. Increasing the use of resources can support more applications with the additional resources that are used in cloud computing environment 50. In the illustrative example, cloud computing environment 50 can include one or more clouds. When more than one cloud is present, cloud computing environment 50 can be referred to as a multi-cloud computing environment. This migration of containers for applications can be within a cloud or between clouds in cloud computing environment 50.

Figure 3:
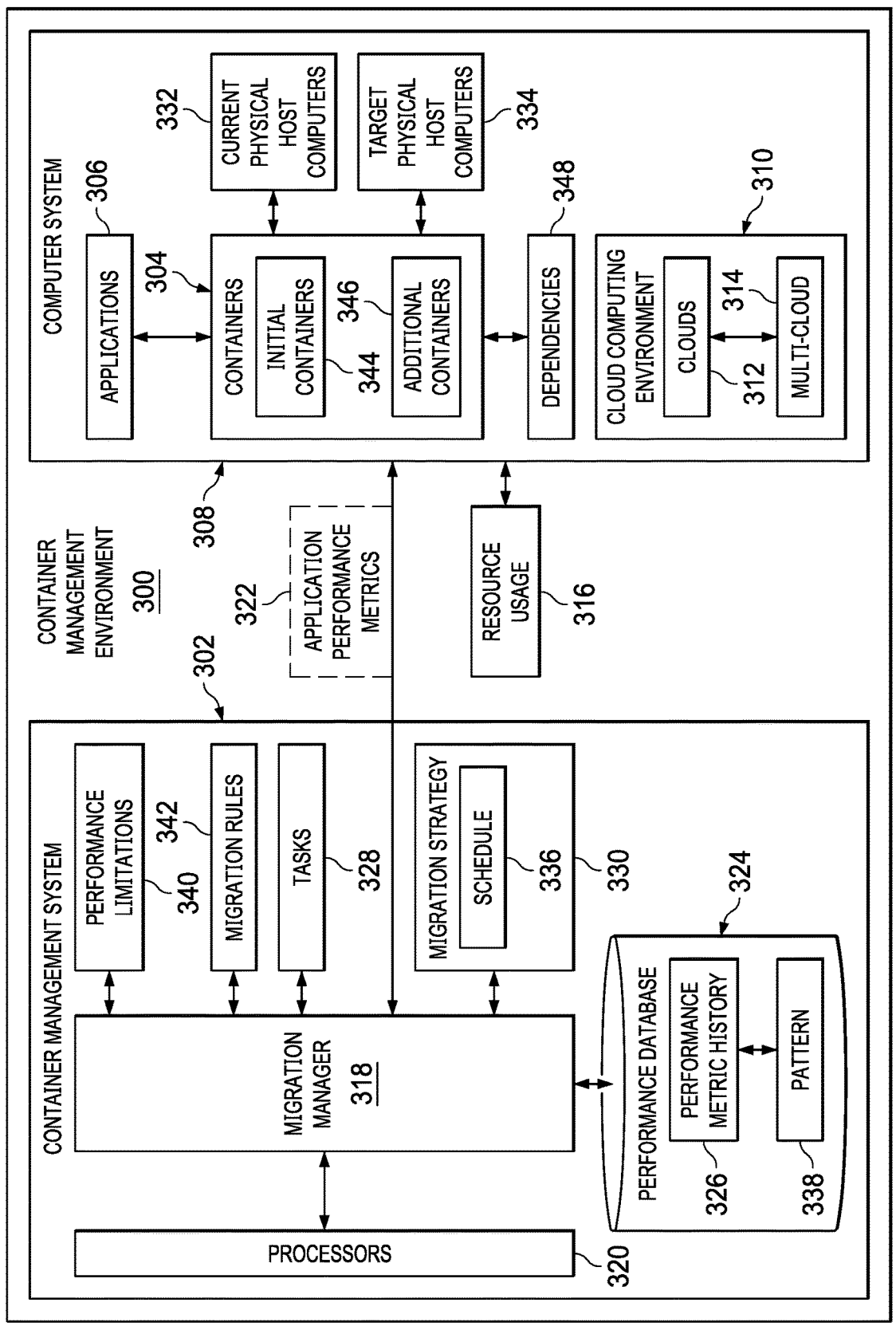
FIG. 3 is a block diagram of a container management environment in accordance with an illustrative embodiment.

With reference now to FIG. 3, a block diagram of a container management environment is depicted in accordance with an illustrative embodiment. In this illustrative example, container management environment 300 includes components that can be implemented in hardware such as the hardware shown in network data processing system 100 in FIG. 1.

In this illustrative example, container management system 302 can be used to manage a set of containers 304 for a set of applications 306 in computer system 308. As used herein, a "set of," when used with reference to items, means one or more items. For example, a "set of containers 304" is one or more of containers 304.

In this depicted example, a container is an executable unit of software in which application code is packaged, along with its libraries and dependencies, in common ways such that the container can be run anywhere. For example, a container can be run in a desktop, a traditional network, or a cloud. As depicted, a container does not need to include a guest operating system in every instance and can leverage features and resources in the host operating system in contrast to virtual machines. In other words, multiple containers can share access to an operating system.

Computer system 308 is a physical hardware system and includes one or more data processing systems. When more than one data processing system is present in computer system 308, those data processing systems are in communication with each other using a communications medium. The communications medium can be a network. The data processing systems can be selected from at least one of a computer, a server computer, a tablet computer, or some other suitable data processing system.

Computer system 308 is a hardware system on which cloud computing environment 310 is located. In this illustrative example, cloud computing environment 310 can be implemented using the components depicted for cloud computing environment 50 shown in FIG. 2.

As depicted, computer system 308 can include a number of clouds 312. As used herein, a "number of," when used with reference to items, means one or more items. For example, a "number of clouds 312" is one or more of clouds 312. When more than one cloud is present in the number of clouds 312, the number of clouds 312 can be referred to as multi-cloud 314.

As depicted, container management system 302 can manage a set of containers 304 for the set of applications 306 in a manner that improves resource usage 316 in computer system 308. In this example, the set of containers 304 for the set of applications 306 can be located in the number of clouds 312 in computer system 308. The set of containers 304 for the set of applications 306 can operate on architecture that does not include the number of clouds 312.

In this illustrative example, container management system 302 comprises migration manager 318 and a set of processors 320. Migration manager 318 runs on the set of processors 320.

Migration manager 318 can be implemented in software, hardware, firmware or a combination thereof. When software is used, the operations performed by migration manager 318 can be implemented in program code configured to run on hardware, such as a processor unit. When firmware is used, the operations performed by migration manager 318 can be implemented in program code and data and stored in persistent memory to run on a processor unit. When hardware is employed, the hardware may include circuits that operate to perform the operations in migration manager 318.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, migration manager 318 can run on a set of processors 320. As used herein, a processor in processor 320 is a hardware device and is comprised of hardware circuits such as those on an integrated circuit that respond and process instructions and program code that operate a computer. When a number of processors execute instructions for a process, the number of processors is one or more processors can be on the same computer or on different computers. In other words, the process can be distributed between processors on the same or different computers in computer system. Further, the number of processors can be of the same type or different type of processors. For example, a number of processors can be selected from at least one of a single core processor, a dual-core processor, a multi-processor core, a general-purpose central processing unit (CPU), a graphics processing unit (GPU), a digital signal processor (DSP), or some other type or processor.

In the illustrative example, migration manager 318 can monitor application performance metrics 322 for applications 306 in a set of clouds 312. Application performance metrics 322 for applications 306 can be selected from at least one of latency, packet loss, throughput, availability, jitter, resource use, storage requirements, or other parameters. These parameters can be quality of service (QoS) parameters specified in a service level agreement (SLA) or any parameter regarding the performance of applications 306.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, application performance metrics 322 monitored by migration manager 318 can be stored in performance database 324 to form performance metric history 326. Performance metric history 326 can be analyzed along with current performance metrics to determine which ones of applications 306 may benefit from a migration of containers 304 for those applications identified in applications 306.

In one illustrative example, a set of processors 320 identifies a set of containers 304 for a set of applications 306 for a migration using a set of application performance metrics 322. In this illustrative example, the set of processors 320 can be some or all of processors 320. In this illustrative example, the set of processors 320 can be located in one or more data processing systems in computer system 308 when computer system 308 comprises more than one data processing system. The set of containers 304 can be one or more containers within the set of applications 306. In other words, the set of containers 304 may not be all of containers 304 for the set of applications 306. In a similar fashion, the set of applications 306 can be some or all of applications 306.

The set of applications 306 can be located in one or more of clouds 312 in cloud computing environment 310. In other words, the set of containers 304 can be located in one or more of clouds 312. The set of application performance metrics 322 can be some or all of application performance metrics 322 that are monitored by migration manager 318.

In the illustrative example, migration manager 318 operates to create a set of tasks 328 following migration strategy 330 to move the set of containers 304 for the set of applications 306 identified for the migration from a set of current physical host computers 332 to a set of target physical host computers 334 using the set of application performance metrics 322. A task in the set of tasks 328 defines the work to be performed or undertaken to move one or more containers in the set of containers 304 from the set of current physical host computers 332 to the set of target physical host computers 334.

In this illustrative example, migration strategy 330 define when tasks 328 are to be performed. For example, migration strategy 330 may include schedule 336 for the set of tasks 328. Schedule 336 can define at least one of an order in which the set of tasks 328 is to be performed, when a task in the set of tasks 328 is to be performed, a priority for performing the set of tasks 328, or other scheduling parameters.

In the illustrative example, schedule 336 can take into account a number of different considerations. For example, schedule 336 for the set of tasks 328 to follow migration strategy 330 can take into account at least one of an execution priority, a time slot for the set of applications, a cloud management rule, or some other consideration.

In the illustrative example, the execution priority can indicate the task priority. For example, Container A can have a priority such as P_D. In this example, P is production and D is a numeric value which indicates the business priority. The numeric value can be automatically adjusted according to execution feedback. As another example, another factor can be an impact of the migration of a container. For example, the Container A has the impact as H, which means high resource demanding and will have a desired improvement after migration. In this case, the impact on application performance is great.

In the illustrative example, a time slot can be a time when movement of the container does not impact the running of the application For example, the time slot can be when an application is not used or has low usage. The time slot can also be based on impacts and performance from the cloud management view.

In this example, a cloud management rule can be, for example, application A cannot be migrated during the whole lifecycle. Another cloud management rule can be operating system level infrastructure cannot be changed during migration. As yet another example, a cloud management rule can predefine a priority such as application A has highest priority than other applications. The priority can be determined using a number of different factors. For example, the priority can be based on the quality of service for different applications.

In creating the set of tasks 328 to follow migration strategy 330, migration manager 318 can also take into account other factors. For example, migration manager 318 can also take into account a set of migration rules 342. The set of migration rules 342 can include rules that relate to at least one of application management, cloud management, government regulations, or other types of factors.

As depicted, migration manager 318 can operate to move the set of containers 304 for the set of applications 306 from the set of current physical host computers 332 to the set of target physical host computers 334 using the set of tasks 328 following migration strategy 330. The set of application performance metrics 322 can be identified after migrating the set of containers 304. This identification of the set of application performance metrics 322 can be used as a feedback to adjust migration strategy 330 for a creation of future tasks for migrating containers 304 for the set of applications 306.

As depicted, migration manager 318 can repeatedly perform the steps to automatically move one or more of containers 304 to increase the performance of one or more of applications 306. Moving the set of containers 304 can increase the performance of applications 306 in addition to applications 306 in the set of applications 306. For example, moving the set of containers 304 for the set of applications 306 can potentially increase the performance for all of applications 306. This increase in performance can be detected through migration manager 318 monitoring application performance metrics 322 for applications 306.

Further, these steps are performed dynamically during the running of applications 306. In other words, it is not a requirement to alter the running of an application to move containers for that application.

In the illustrative example, migration manager 318 can operate to determine pattern 338 for the set of application performance metrics 322 in performance metric history 326. Pattern 338 can include, for example, service operating patterns such as operation time period, business peak, business troughs, data communication volumes, and other types of patterns in application performance metrics 322. In the illustrative example, pattern 338 can also include a pattern of resource consumption by containers 304 in applications 306. This resource consumption can include, for example, processor resources, stored resources, network communications, or other resource use.

This pattern can be used to determine migration strategy 330. For example, pattern 338 can indicate that processing resources for Application A are insufficient on physical host computer E during time t. Pattern 338 can also indicate that resources needed by Application A are present on physical host computer F during time t. This pattern may also indicate that the processing resources are not present on physical host computer F during time t but are present on physical host computer E during time t. In other words, pattern 338 can indicate that the availability of resources changes on a periodic basis between physical host computer E and physical host computer F.

With this example, migration strategy 330 can include a set of tasks 328 to move Application A from physical host computer E to physical host computer F at time t and then moving Application A back to physical host computer E from physical host computer F at time t+1. The set of tasks 328 can be repeated under schedule 336 to follow migration strategy 330 based on the identification of pattern 338.

In the illustrative example, the set of containers 304 can be identified from containers 304 by migration manager 318 in a number of different ways. For example, migration manager 318 can identifying a set of performance limitations 340 for the set of applications 306 based on the set of application performance metrics 322. For example, the set of performance limitations 340 can be latency in responding to requests from a client.

Migration manager 318 can identify the set of containers 304 for the set of applications 306 causing the set of performance limitations 340 for the set of applications 306. For example, migration manager 318 may determine that the input/output (I/O) frequency of disk access is not great enough in a container in the set of containers 304 and the I/O frequency cannot be supported by the current disk system in the current physical host computer on which the container is located. This limitation on the disk I/O is a cause of latency in this illustrative example. As a result, the container with the I/O frequency limitation is considered because of the latency issue in the set of performance limitations 340.

With the identification of the set of containers 304 and the set of performance limitations 340, migration manager 318 can identify the set of target physical host computers 334 to which movement of the set of containers 304 for the set of applications 306 reduces the set of performance limitations 340. In this example, migration manager 318 can identify another physical host computer that has a desired level of disk I/O as a target physical host computer. This type of analysis can be performed for each container in the set of containers 304.

Further, migration manager 318 can identify the set of containers 304 in a manner that increases the performance of the set of applications 306 beyond analyzing performance increases for individual containers. For example, migration manager 318 can also take into account dependencies 348 between containers 304 in identifying the set of containers 304 for migration. In one illustrative example, migration manager 318 can identify a set of initial containers 344 for the set of applications 306 for the migration using the set of application performance metrics 322. For example, each container in the set of initial containers 344 can be a container that has been identified to be the cause of a performance limitation in the set of performance limitations 340 identified from analyzing the set of application performance metrics 322.

In this illustrative example, migration manager 318 can identify a number of additional containers 346 having dependencies 348 to the set of initial containers 344 for the set of applications 306. The set of initial containers 344 and the number of additional containers 346 form the set of containers 304 for the set of applications 306 that are identified for movement.

As a result, by taking into account dependencies 348 between containers 304 in an application in generating tasks to move containers 304, the performance of an application can be improved or maintained as compared to current techniques that focus on the performance of containers 304 without taking into account dependencies 348 between containers 304 in an application.

In one illustrative example, one or more technical solutions are present that overcome a technical problem with container migration in a manner that improves more than the performance of a container that is moved. As a result, one or more technical solutions may provide a technical effect improving the performance of applications 306 when moving containers 304 from one host computer to another host computer. Further, one or more technical solutions are present in which application performance metrics 322 for application 306 are considered in determining which ones of containers 304 should be moved from a set of current physical host computers 332 to a set of target physical host computers 334.

In the illustrative examples, the generation of tasks 328 following migration strategy 330 on an application level can be performed in a manner that can reduce imbalances in usage of resources in computer system 308. In the illustrative example, migration manager 318 can generate tasks 328 following migration strategy 330 that increase the performance of one or more applications 306 in computer system 308. Tasks 328 can be generated by migration manager 318 in a manner that increases the performance of many applications rather than a single application in applications 306. Further, tasks 328 can be generated in a manner that increases the use of resources such that the presence of idle or underused resources in the computer system 308 is reduced.

Further, migration manager 318 can operate to continuously monitor application performance metrics 322 and automatically identify and create tasks 328 following migration strategy 330 to move containers 304 for applications 306 as needed to improve application performance metrics 322 for applications 306. Further, the movement of containers 304 can also be performed to increase the utilization of resources in cloud computing environment 310. In other words, current techniques for identifying and moving containers 304 improve the performance of those containers but can result in underutilization of resources. Migration manager 318 can identify application performance metrics 322 that take into account resource usage 316 and availability in cloud computing environment 310. In other words, the creation of tasks 328 to move the set of containers 304 for a set of applications 306 can improve the performance of more than just the applications in the set of applications 306.

With improved utilization of resources and cloud computing environment 310, improvements in application performance metrics 322 for additional applications in applications 306 in addition to the set of applications 306 can be achieved. As a result, the creation of the set of tasks 328 can increase the set of application performance metrics 322 by increasing the usage of resources in cloud computing environment 310 in which increased usage of resources by additional applications in applications 306 can run with increases in application performance metrics 322.

The set of processors 320 in computer system 308 can be configured to perform at least one of the steps, operations, or actions described in the different illustrative examples using software, hardware, firmware, or a combination thereof. As a result, computer system 308 operates as a special purpose computer system in which migration manager 318 in computer system 308 enables the migration of containers 304 in a manner that improves the performance of applications 306. For example, migration manager 318 can automatically perform container migration of one or more containers 304 based on improving the performance of applications 306 and one or more of clouds 312.

In the illustrative example, the performance of applications 306 can be monitored continuously to move containers 304 in a manner that maintains or increases the performance of applications 306. The movement of containers 304 can also be performed to increase the performance of clouds 312 such as increasing efficient usage of resources within clouds 312. Thus, migration manager 318 in the set of processors 320 transforms computer system 308 with the set of processors 320 into a special purpose computer system as compared to currently available general computer systems that do not have migration manager 318 in the set of processors 320.

In the illustrative example, the use of migration manager 318 in the set of processors 320 integrates processes into a practical application for migrating containers 304 that increases the performance of computer system 308. The performance of computer system 308 can be an increase the efficiency in resource usage 316. For example, the migration of containers 304 can be performed taking into account the performance applications such that resource usage 316 can be increased in computer system 308 such that idle or underutilized resources are reduced in computer system 308.

The illustration of container management environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although processors 320 are shown as a separate component in computer system 308, one or more processors 320 can be located in computer system 308 in some illustrative examples. Although the illustrative examples have been described with respect to computer system 308 including cloud computing environment 310 in which a set of clouds 312 is present, other illustrative examples can be used to migrate containers 304 and other types of computing environments. For example, migration manager 318 can be implemented to manage containers 304 in a grid computing environment, a peer-to-peer computing environment, a fog computing environment, a client/server computing environment, or some other computing environment in addition to or in place of cloud computing environment 310.

Figure 4:
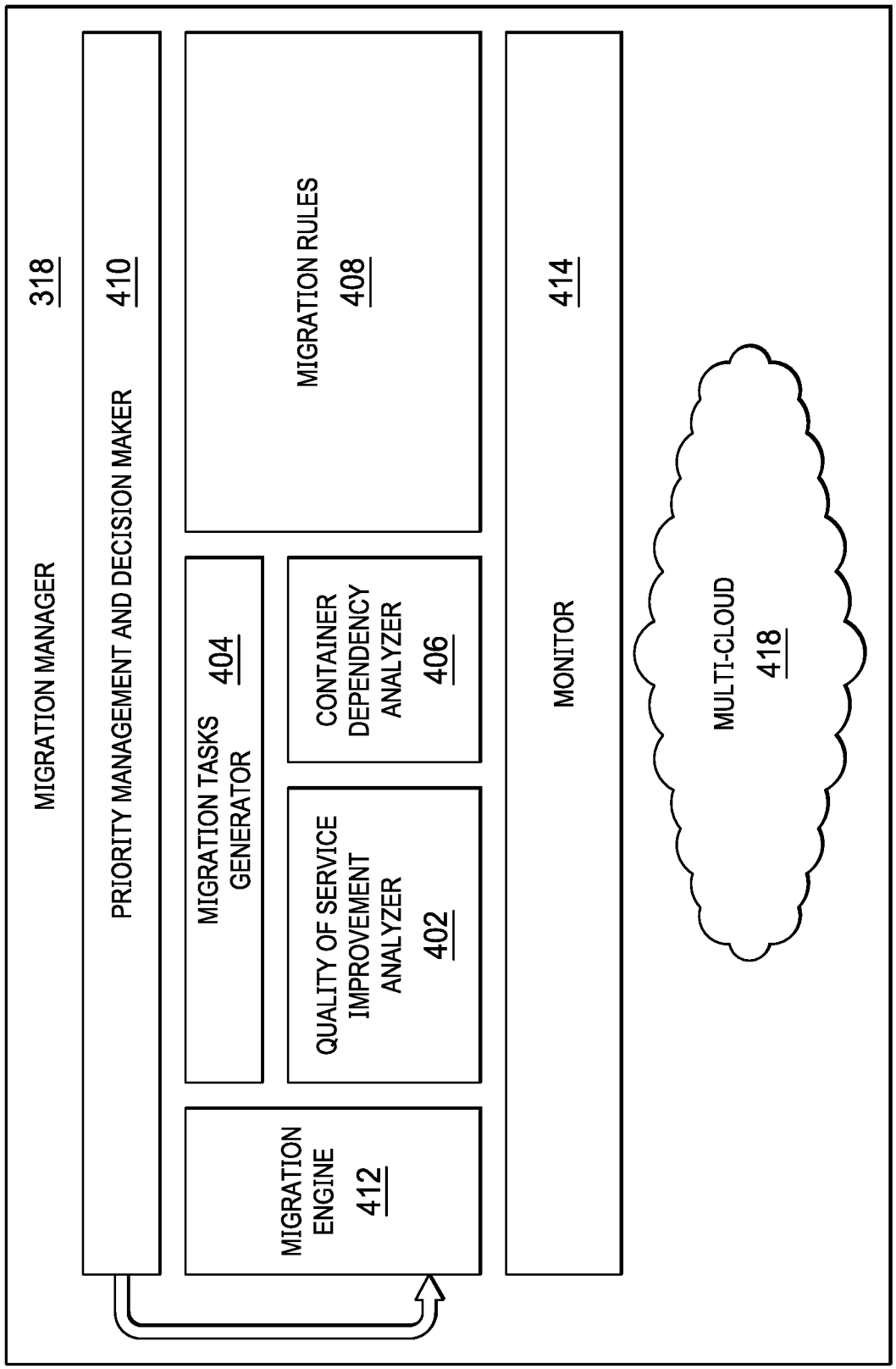
FIG. 4 is an illustration of components in a container manager in accordance with an illustrative embodiment.

With reference next to FIG. 4, an illustration of components in a container manager is depicted in accordance with an illustrative embodiment. In the illustrative examples, the same reference numeral may be used in more than one figure. This reuse of a reference numeral in different figures represents the same element in the different figures.

In FIG. 4, examples of components that can be used to implement migration manager 318 in FIG. 3 are depicted. As depicted in this illustrative example, migration manager 318 comprises quality of service improvement analyzer 402, migration tasks generator 404, container dependency analyzer 406, migrations rules 408, priority management and decision maker 410, migration engine 412, and monitor 414.

As depicted, the different components in migration manager 318 can operate to manage containers in multi-cloud 418. In this example, multi-cloud 416 comprises several clouds. These clouds can be, for example, public clouds, private clouds, or a combination of the two. Workloads can be distributed across multiple clouds in multi-cloud 416.

Monitor 414 operates to a cloud computing environment in the form of multi-cloud 418. For example, monitor 414 can perform at least one of container resource monitoring, physical host resource monitoring, container affinities monitoring, and container clusters operation patterns monitoring. Container resource monitoring can comprise monitoring resource usage by individual containers. Physical host resource monitoring can comprise monitoring resource usage by physical host server computers in one or more clouds.

In this illustrative example, monitor 414 can perform container affinities monitoring which includes collecting the container communications information between containers in multi-cloud 418. This container communications information can include, for example, messages, data, commands, or other types of communication information. Monitor 414 can collect information about the behavior of running applications. This information can be used to determine patterns in application activity. These patterns can be used to generate a strategy for performing migrations of containers within or between clouds in multi-cloud 418.

As depicted, monitor 414 can be performed using an artificial intelligence system. An artificial intelligence system is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

A machine learning model is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

Quality of service (QoS) improvement analyzer 402 can identify components that have a performance that is lower than desired using the information monitored by monitor 414. The information generated by monitor 414 can be used to determine the performance of various components in multi-cloud 418.

For example, the quality of service may be measured using a performance metric such as such as latency, packet loss, throughput, availability, jitter, or other parameters. Quality of service improvement analyzer 402 can determine these performance metrics for components such as a set of applications, an application, a physical host server computer, a container, a set of containers, a set of applications, or other types of components.

In this illustrative example, quality of service improvement analyzer 402 can analyze application performance metrics for applications to determine which applications are not performing as desired. These application performance metrics can be analyzed to determine performance limitations in containers when one or more application performance metrics to not meet desired levels. In this manner, quality of service improvement analyzer 402 can determine which containers should be moved to improve application performance for a single application or for multiple applications in the cloud.

Additionally, quality of service improvement analyzer 402 can determine target physical host computers for the containers that would reduce or remove performance limitations encountered by the containers in the current physical host computers. As a result, moving containers to these target physical host computers can result in improving the performance of the application for which the application performance metrics do not meet desired levels.

Container dependency analyzer 406 can identify a dependency relationship between two or more containers. In this illustrative example, the identification of the dependency between two or more containers can be performed by container dependency analyzer 406 using container communications information collected by container affinities monitoring and monitor 414. This information is analyzed by migration manager 318 to determine the container affinities.

Container dependency analyzer 406 can be used to identify containers that should be moved together when one of the containers in the dependency relationship is selected for migration. For example, if quality of service improvement analyzer 402 determines that Container A for Application Z can be moved to improve the performance of Application Z, service improvement analyzer 402 can also determine that Container A has a dependency with Container B and Container E using container dependency analyzer 406. As a result, quality of service improvement analyzer 402 can identify Container A, Container B, and Container E for movement to improve one or more performance metrics for Application Z.

In this illustrative example, migration tasks generator 404 can create a set of tasks that follows a migration strategy. In this illustrative example, a task defines a piece of work such as moving a container from one physical host computer to another physical host computer. In the illustrative example, more than one task may be performed to move a container.

Migration tasks generator 404 can generate the set of tasks to move one or more containers that follows a schedule. The schedule can set out at least one of an order, a time, or other parameter for migrating a set of containers.

In generating tasks to move containers, migration tasks generator 404 uses a number of different pieces of information to generate the tasks to move containers. For example, migration tasks generator 404 can use at least one of a current physical host computer, a target physical host computer, containers identified for movement, a time slot, a priority, a method, a routine strategy, a migration rule, a cost, an impact, a risk, an owner, or other suitable types of information.

In this example, a time slot is the time that container can be moved without impacting the operation of the application. The time slot can also be based on movement of the container that does not impact the operation of a cloud for multiple applications in the cloud. As depicted, a party can be assigned to a container indicating which containers should be moved first. The method can be the manner in which a container is to be moved.

A routine strategy can be how often a container should be moved. For example, a container may be migrated once a week, every day, or based on some events occurring that may be nonperiodic. A migration rule can define when and how a container should be moved.

The cost may be a cost of resources needed to move the container. The impact can be the impact on the operation of the application. The risk can be the risk of reduced performance during movement of the container. The owner may be the application to which the container belongs.

One or more of these pieces of information can be used to generate tasks that define which containers should be moved from current physical host computers to target physical host computers. The manner in which the containers are moved can be defined in a schedule using the pieces of information.

In this illustrative example, migration rules 408 defines rules with respect to migrating containers. In this illustrative example, migration rules 408 may comprise at least one of default rules or automatically generated rules. Further, migration rules 408 can be created or modified based on user input in the illustrative examples.

As depicted, migration rules 408 can include at least one of application management rules, cloud management rules, or other rules, regulations, or principles governing how and when migrations can occur.

In this illustrative example, priority management and decision maker 410 can generate a runbook of procedures and operations for migrating containers based on the schedule for a set of tasks for migrating containers. As depicted, the runbook can include a list of the set of tasks following a migration strategy. The runbook can include a schedule that specifies an order and time of when tasks in the list are to be performed. This list of tasks can be placed in a priority of importance or can include priority identifiers.

In this illustrative example, user input may be received to approve or modify the tasks and schedule in the runbook. In this illustrative example, the modification can include at least one of removing a task, adding a task, or changing a schedule for a task. In other illustrative examples, approval or changes to the runbook may be performed by an artificial intelligence system.

When changes are made to the runbook, those changes can be used as feedback to update rules in migration rules 408. These updates to migration rules 408 can adjust the migration strategy used by migration tasks generator 404 to created future tasks for migrating containers.

The approved tasks and schedule can be sent to migration engine 412. Migration engine 412 is a software component that moves containers from a set of current physical host computers to a set of target physical host computers using the set of tasks and the schedule.

The illustration of the different components for migration manager 318 in FIG. 3 are presented as one manner in which components can be implemented in migration manager 318. This illustration is not meant to limit the manner in which migration manager 318 can be implemented in other illustrative examples. For example, migration engine 412 can be considered a separate component that migration manager 318 communicates with to move containers. In another illustrative example, priority management and decision maker 410 may be omitted. With this example, the set of tasks following a migration strategy that includes a schedule can be sent to migration engine 412 from migration tasks generator 404 to automatically migrate the containers.

In the illustrative example, migration manager 318 automatically migrates containers for applications without needing user input. Migration processes performed by migration manager 318 using the components depicted in FIG. 4 can be performed continuously in which monitoring of the performance of applications is continuously performed and tasks are generated as needed to increase or maintain application performance metrics for applications in multi-cloud 418. These processes are performed dynamically without needing to cease operation of processes within multi-cloud 418.

Figure 5:
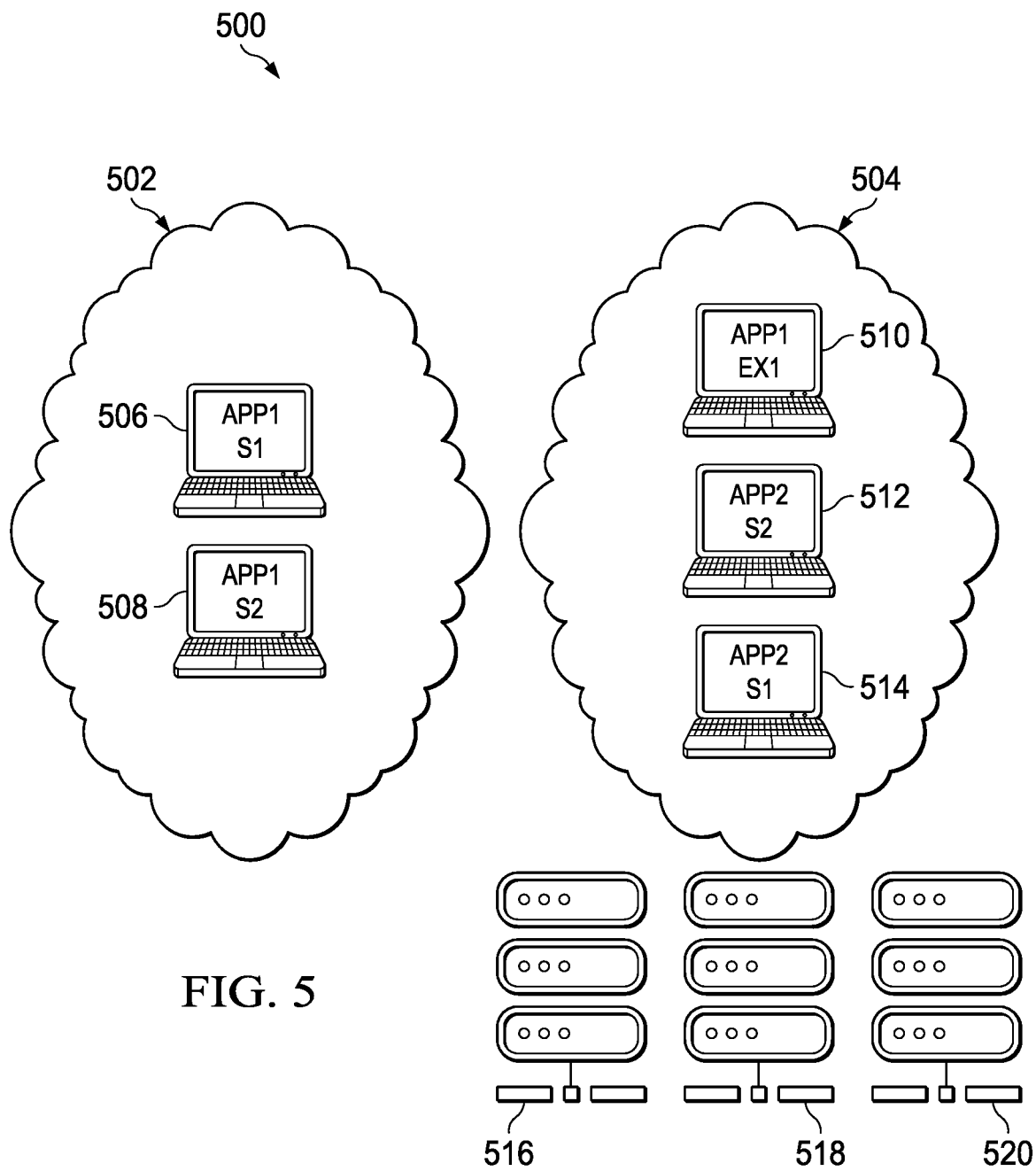
FIG. 5 is an illustration of containers in a multi-cloud in accordance with an illustrative embodiment.
Figure 6:
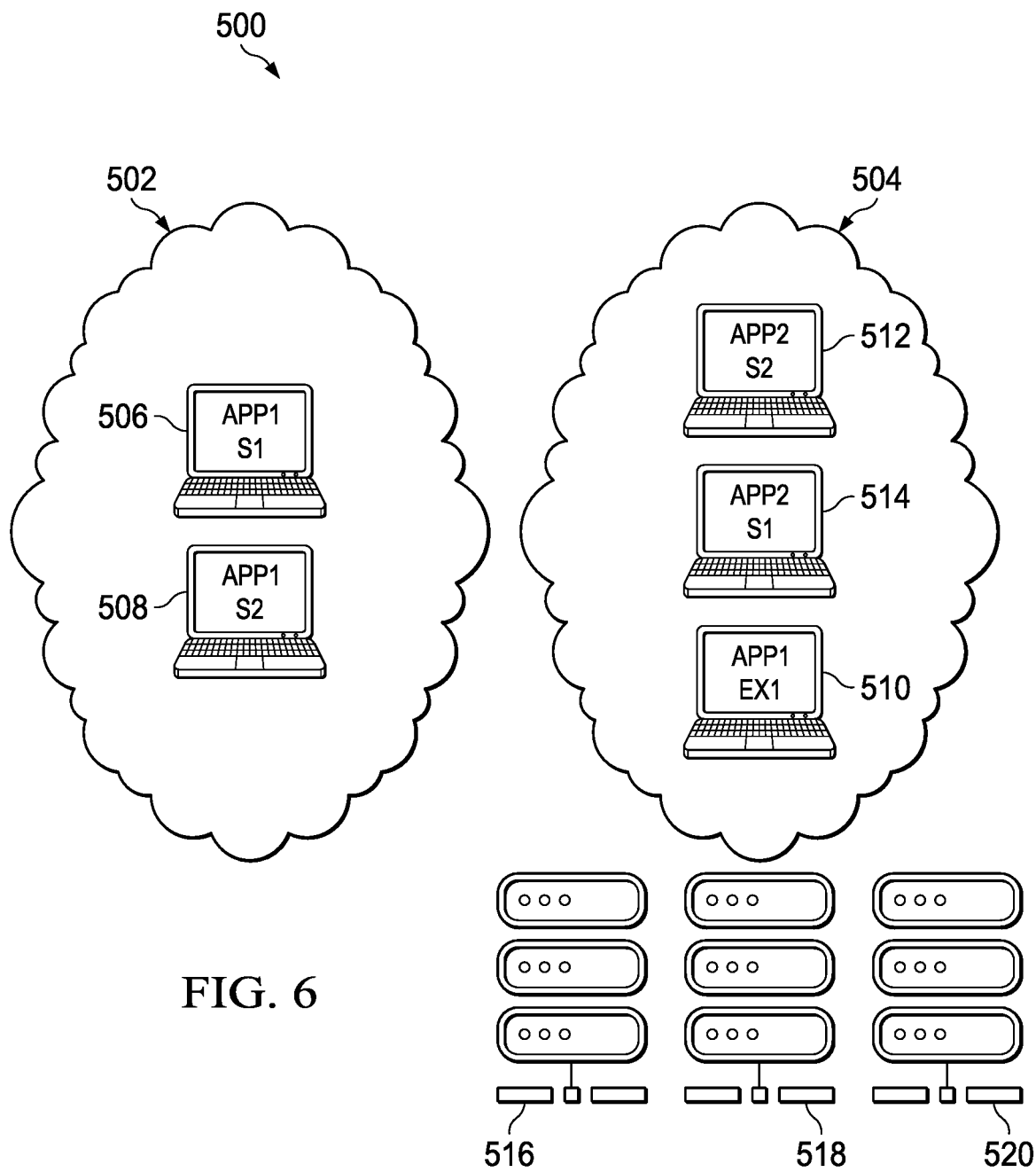
FIG. 6 is an illustration of movement of a container in a multi-cloud in accordance with an illustrative embodiment.

FIG. 5 and FIG. 6 illustrate the automatic migration containers in a multi-cloud in accordance with an illustrative embodiment. Turning first to FIG. 5, an illustration of containers in a multi-cloud is depicted in accordance with an illustrative embodiment. In this illustrative example, multi-cloud 500 includes cloud 502 and cloud 504. These clouds support different geographic locations. For example, cloud 502 supports access clients in China while cloud 504 supports access by clients in the United States.

As depicted, a first application comprises container 506 and container 508 in cloud 502. The first application also accesses an external service in container 510 located in cloud 504. This first application runs during the daytime in China.

A second application runs in cloud 504 and is active during the daytime in the United States. The second application comprises container 512 and container 514.

As depicted, container 510, container 512, container 514 are running on physical host computer 516. In this example, physical host computer 518 and physical host computer 520 are also present in cloud 504.

In this illustrative example, the performance metric can be the latency for the first application. When the latency has an undesirable level, a performance limitation in one or more containers for the application can be, for example, a network communication between containers in different clouds.

If the latency of the first application is greater than the quality of service specified for latency for the first application, a further analysis can be made to determine the performance limitation causing the undesired latency for the first application. In this example, the performance limitation can be the network communication between cloud 502 and cloud 504 for container 510 in the first application.

As depicted, physical host computer 516 is the only physical host computer in cloud 502 that has a desired level of network communication performance with container 506 and container 508 for the first application in cloud 502. Also, container 512 and container 514 for the second application is an important application that is required to be deployed on physical host computer 516. In this example, however, physical host computer 516 does not have sufficient resources such as buffer space to run container 510 for the first application and container 512 and container 514 for the second application.

In this example, a pattern of application performance metrics for the first application and the second application indicates that the second application is active during daytime hours in the United States, but not active at nighttime hours in the United States. Further, the pattern of application performance metrics indicates that the first application is not active during the day in the United States but is active at night in the United States. As a result, by using application performance metrics focusing on the performance of the applications, tasks can be created to improve or maintain the desired level of performance for both the first application and the second application.

With reference next to FIG. 6, an illustration of movement of a container in a multi-cloud is depicted in accordance with an illustrative embodiment. In this illustrative example, a set of tasks can move container 510 in a manner that increases the performance of both the first application and the second application.

For example, container 510 can be moved from physical host computer 516 to physical host computer 518 in a time slot from 08:00 CDT to 09:00 CDT without shutting down container 510. This movement of container 510 frees up sufficient resources for container 512 and container 514 for the second application to run during the daytime. Movement of container 510 to physical host computer 518 does not impact the performance of the second application since the second application in cloud 502 is not active during the day in the United States.

Another task can be created to move container 510 from physical host computer 518 to physical host computer 516 in a timeslot from 20:00 CDT to 21:00 CDT without shutting down container 510. In this manner, container 510 is located in physical host computer 516 during the time in which the second application is active and container 506 and container 508 need to access the service provided by container 510. During this time period, container 512 and container 514 with second application are not active. These different timeslots can be part of the schedule that controls when the tasks are performed.

These two tasks can be performed automatically to move container 510 between physical host computers 516 and physical host computer 518 in a manner that improves the performance of both the first application and the second application. In this example, the tasks can be performed to provide a desired level of network connection for container 510, thus reducing the latency of the first application. The two tasks also improve the performance of container 512 and container 514 for the second application.

As a result, this automatic movements of container 510 between physical host computers in cloud 504 improves the performance of both applications. In contrast, by improving the performance of a single container as with current techniques, only the first application can be increased.

Further, continued monitoring of the performance metrics for first application and the second application can identify changes in when these two applications are active. Changes in the time when the two applications are active can result in the automatic generation of new tasks for the modification of current tasks to move containers to maintain or obtain a desired level of performance for the two applications. As another example, the network communication using physical host computer 516 can change such that another physical host computer in cloud 504 may be more suitable for container 510 to provide a desired network connection to container 506 and container 508 in cloud 502.

This illustration of moving a container to reach a desirable performance for two applications is only provided as an illustrative example and not meant to be limiting the manner in which other illustrative examples can be implemented. For example, the analysis and automatic cast generation can be performed for additional applications that are located in cloud 502 and cloud 504 in addition to or in place of the first application and the second application. The automatic analysis and task generation can also be performed for one or more clouds in addition to or in place of cloud 502 and cloud 504 in multi-cloud 500. In this manner, the quality of service for some or all applications in multi-cloud 500 can be balanced or improved to meet a quality of service (QoS) level that may be specified in a service level agreement (SLA).

Figure 7:
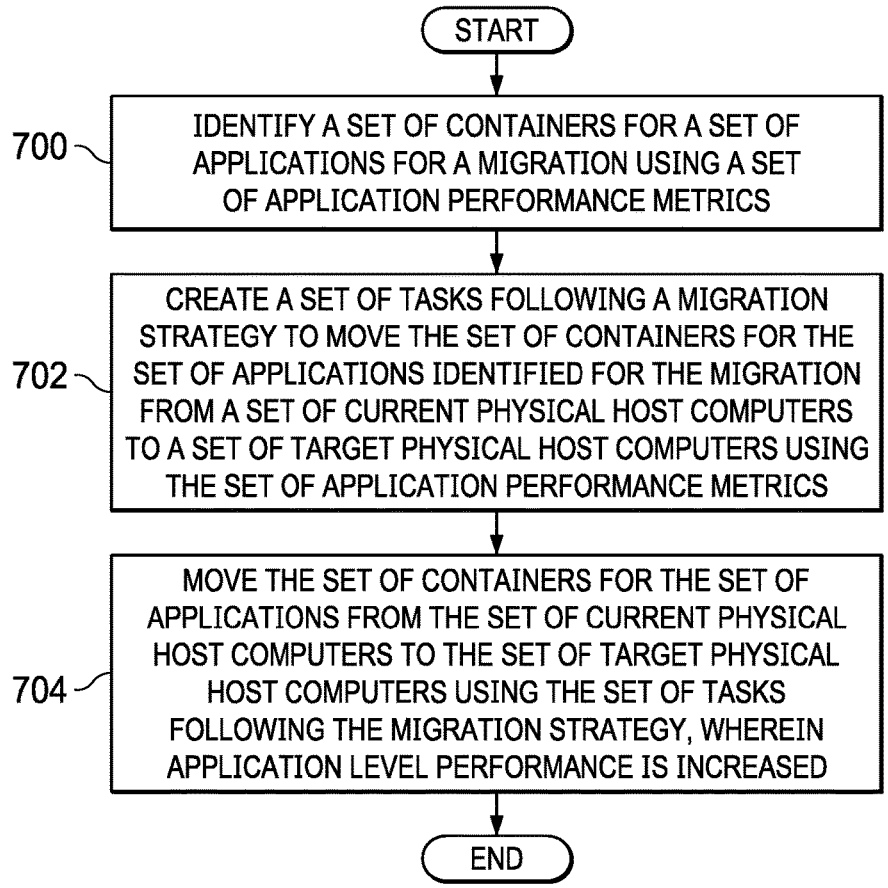
FIG. 7 is a flowchart of a process for automatic container migration in accordance with an illustrative embodiment.

Turning next to FIG. 7, a flowchart of a process for automatic container migration is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in migration manager 318 in running on a set of processors 320 in computer system 308 in FIG. 3.

The process begins by identifying a set of containers for a set of applications for a migration using a set of application performance metrics (step 700). The process creates a set of tasks following a migration strategy to move the set of containers for the set of applications identified for the migration from a set of current physical host computers to a set of target physical host computers using the set of application performance metrics (step 702).

The process moves the set of containers for the set of applications from the set of current physical host computers to the set of target physical host computers using the set of tasks following the migration strategy, wherein application level performance is increased (step 704). The process terminates thereafter.

Figure 8:
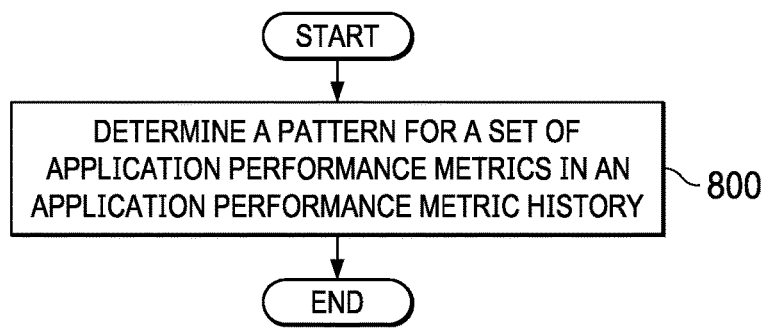
FIG. 8 is a flowchart of a process for determining a pattern in accordance with an illustrative embodiment.

Turning next to FIG. 8, a flowchart of a process for determining a pattern is depicted in accordance with an illustrative embodiment. This flowchart illustrates an additional step that can be performed with the steps in the process in FIG. 7.

The process determines a pattern for a set of application performance metrics in an application performance metric history (step 800). The process terminates thereafter. With step 800, the creating step in step 702 in FIG. 7 can create the set of tasks following the migration strategy to move the set of containers for the set of applications identified for the migration from a set of current physical host computers to a set of target physical host computers using the pattern for the set of application performance metrics identified in the application performance metric history.

Figure 9:
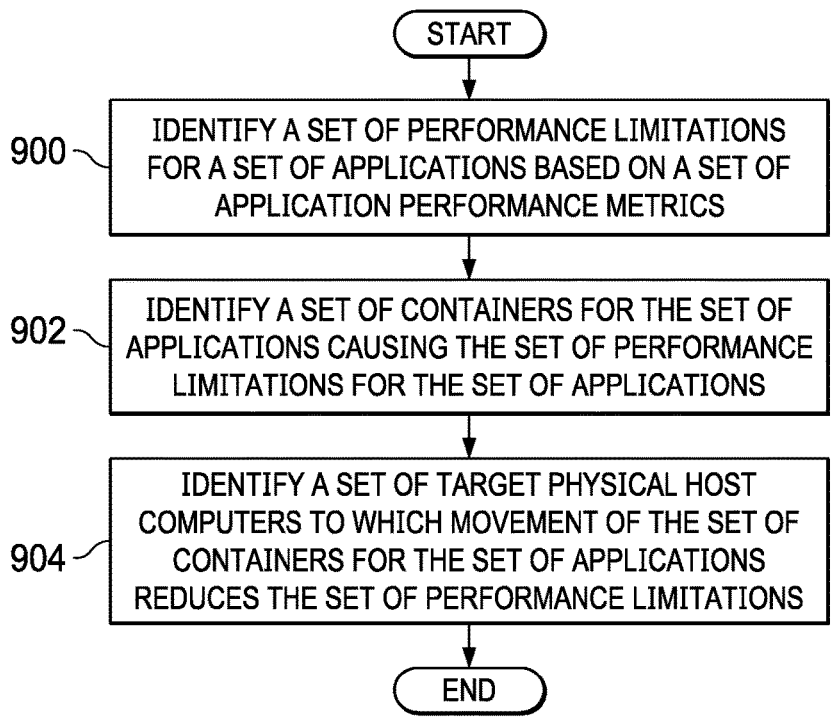
FIG. 9 is a flowchart of a process for identifying a set of containers for migration in accordance with an illustrative embodiment.

In FIG. 9, a flowchart of a process for identifying a set of containers for migration is depicted in accordance with an illustrative embodiment. The process in FIG. 9 is an example of one implementation for step 700 in FIG. 7.

The process begins by identifying a set of performance limitations for a set of applications based on a set of application performance metrics (step 900). The process identifies a set of containers for the set of applications causing the set of performance limitations for the set of applications (step 902).

The process identifies the set of target physical host computers to which movement of the set of containers for the set of applications reduces the set of performance limitations (step 904). The process terminates thereafter.

Figure 10:
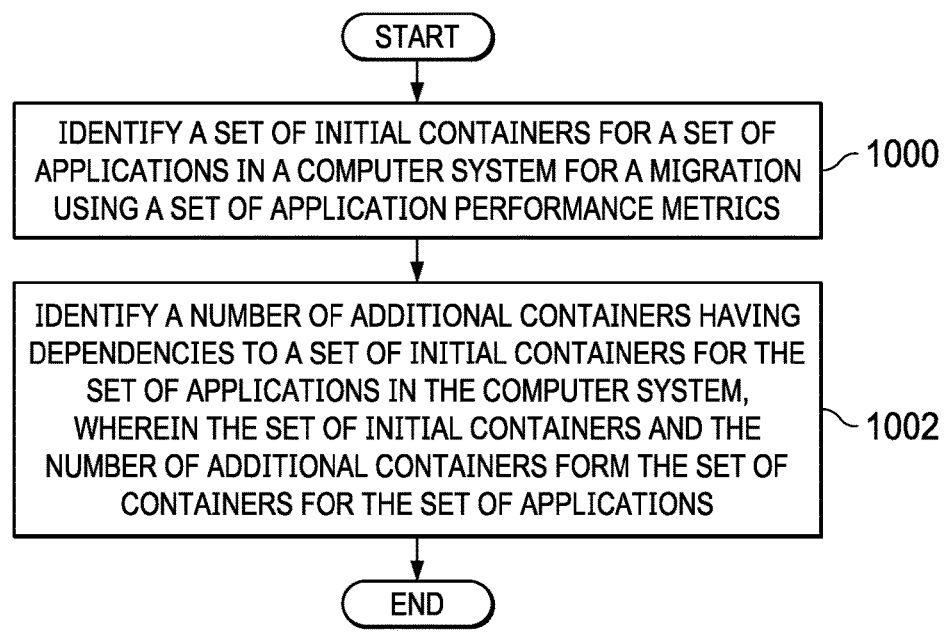
FIG. 10 is a flowchart of a process for creating a set of tasks in accordance with an illustrative embodiment.

Turning now to FIG. 10, a flowchart of a process for creating a set of tasks is depicted in accordance with an illustrative embodiment. The process illustrated in FIG. 10 is an example of one implementation for step 700 in FIG. 7.

The process begins by identifying and a set of initial containers for a set of applications in a computer system for a migration using a set of application performance metrics (step 1000). The process identifies a number of additional containers having dependencies to the set of initial containers for the set of applications in the computer system, wherein the set of initial containers and the number of additional containers form the set of containers for the set of applications (step 1002). The process terminates thereafter.

With the flowchart in FIG. 10, application performance can be improved by also including containers that have dependencies on containers identified for migration. These dependencies are dependencies in which the containers should run on the physical host computers increasing or reaching a desired level of performance in the application. Although movement of a container identified based on the container contributing to the reduction in performance of the application can increase the performance of that container, this movement may not improve the performance of the application if another container has a dependency to the container being moved to another physical host computer.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
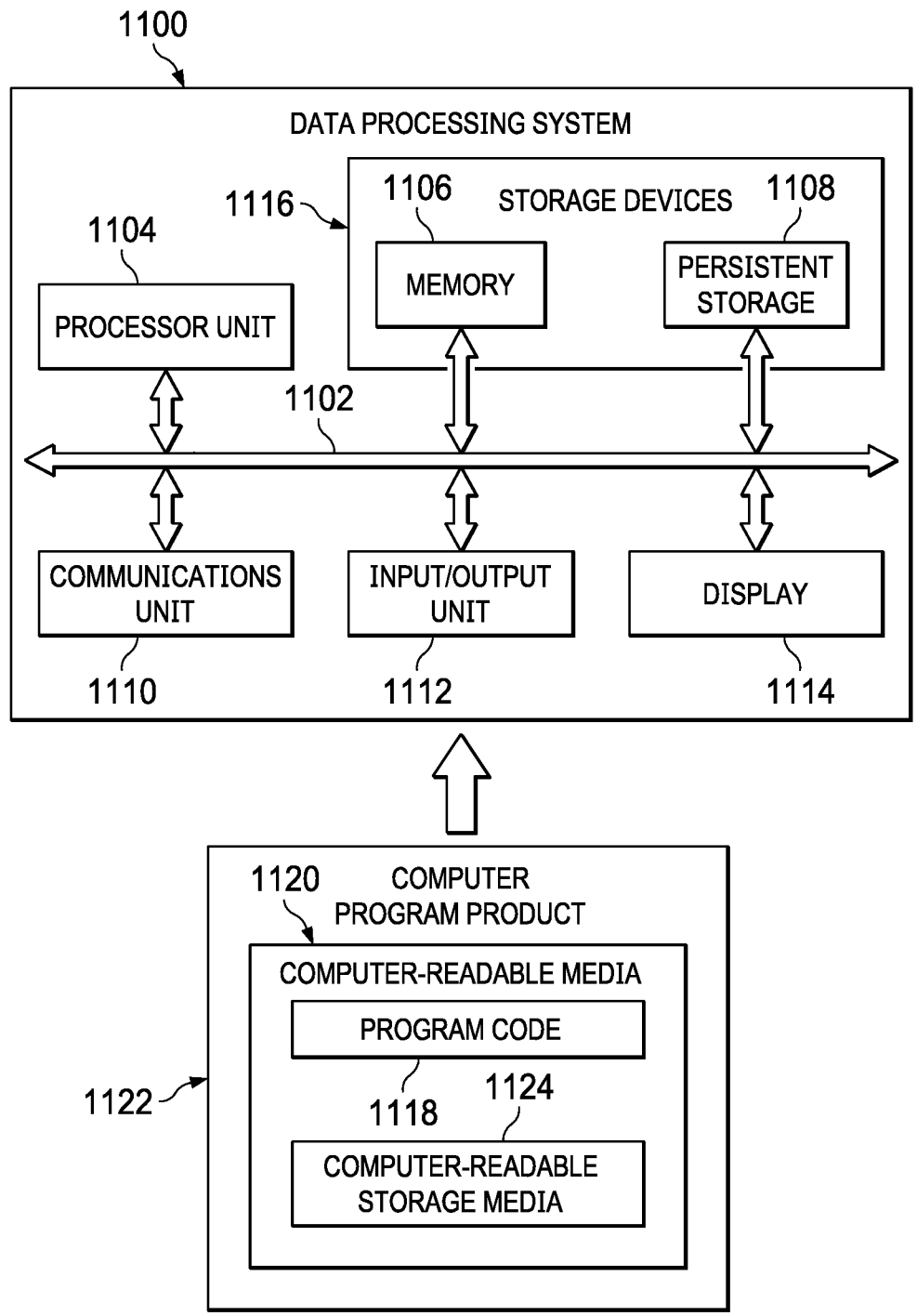
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement physical dark data processing systems such as cloud computing nodes 10 in cloud computing environment 50 in FIG. 1. Data processing system 1100 can also be used to implement cloud consumers such as cellular telephone 54A, desktop computer 54B, laptop computer 54C, and automobile computer system 54N. Data processing system 1100 can also be used to implement data processing systems in computer system 308 and in clouds 312 in cloud computing environment 310 in FIG. 3. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are program instructions and are also referred are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 can be transferred to data processing system 1100 using a computer-readable signal media. The computer-readable signal media are signals and can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Thus, the illustrative embodiments of the present invention provide a method, apparatus, system, and computer program product for container migration. A set of processors operates to identify a set of containers for a set of applications for a migration using a set of application performance metrics. The set of processors operates to create a set of tasks following a migration strategy to move the set of containers for the set of applications identified for the migration from a set of current physical host computers to a set of target physical host computers using the set of application performance metrics. The set of processors operates to move the set of containers for the set of applications from the set of current physical host computers to the set of target physical host computers using the set of tasks following the migration strategy.

In the illustrative examples, the generation of tasks following a migration strategy on an application level can be performed in a manner that can reduce imbalances in usage of resources in a computer system. In the illustrative example, the migration manager can generate tasks following a migration strategy that increases the performance of one or more applications in the computer system. The tasks can be generated in a manner that increases the performance of many applications rather than a single application. Further, the tasks can be generated in a manner that increases the use of resources such that the presence of idle or underused resources in the computer system is reduced.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for a container migration, the method comprising:
    identifying, by a set of processors, a set of containers for a set of applications for a migration using a set of application performance metrics;
    creating, by the set of processors, a set of tasks following a migration strategy to move the set of containers for the set of applications identified for the migration from a set of current physical host computers to a set of target physical host computers using the set of application performance metrics;
    moving, by the set of processors, the set of containers for the set of applications from the set of current physical host computers to the set of target physical host computers using the set of tasks following the migration strategy; and
    monitoring application performance metrics for at least one of the set of applications or applications in a plurality of clouds,
    wherein the set of application performance metrics identified after migrating the set of containers is used as a feedback to a machine learning model comprising a machine learning algorithm to adjust the migration strategy for a creation of future tasks for migrating containers for the set of applications.

2. The method of claim 1 further comprising:
    determining, by the set of processors, a pattern for set of application performance metrics in an application performance metric history;
    wherein creating, by the set of processors, the set of tasks to move the set of containers for the set of applications identified for the migration from the set of current physical host computers to the set of target physical host computers using the set of application performance metrics comprises:
        creating, by the set of processors, the set of tasks following the migration strategy to move the set of containers for the set of applications identified for the migration from the set of current physical host computers to the set of target physical host computers using the pattern for the set of application performance metrics identified in the application performance metric history, wherein application level performance is increased by using the set of tasks following the migration strategy to move the set of containers.

3. The method of claim 1, wherein the migration strategy comprises:
    a schedule for the set of tasks, wherein the schedule takes into account at least one of an execution priority, a time slot for the set of applications, or a cloud management rule.

4. The method of claim 1, wherein identifying the set of containers for the set of applications for a migration using the set of application performance metrics comprises:
    identifying a set of performance limitations for the set of applications based on the set of application performance metrics; and
    identifying the set of containers for the set of applications causing the set of performance limitations for the set of applications.

5. The method of claim 1, wherein creating, by the set of processors, the set of tasks following the migration strategy to move the set of containers for the set of applications identified for the migration from the set of current physical host computers to the set of target physical host computers using the set of application performance metrics comprises:
    creating, by the set of processors, the set of tasks following the migration strategy to move the set of containers for the set of applications identified for the migration from the set of current physical host computers to the set of target physical host computers using the set of application performance metrics and a set of migration rules.

6. The method of claim 1, wherein identifying, by the set of processors, the set of containers for the set of applications for the migration using the set of application performance metrics comprises:
    identifying, by the set of processors, a set of initial containers for the set of applications for the migration using the set of application performance metrics; and
    identifying, by the set of processors, a number of additional containers having dependencies to the set of initial containers for the set of applications, wherein the set of initial containers and the number of additional containers form the set of containers for the set of applications.

7. The method of claim 1, wherein the set of current physical host computers are located in a first cloud in a multi-cloud computing environment comprising the plurality of clouds and the set of target physical host computers are in a second cloud in the multi-cloud.

8. A container management system comprising:
    a set of processors that operates to:

identify a set of containers for a set of applications for a migration using a set of application performance metrics;

create a set of tasks following a migration strategy to move the set of containers for the set of applications identified for the migration from a set of current physical host computers to a set of target physical host computers using the set of application performance metrics; and move the set of containers for the set of applications from the set of current physical host computers to the set of target physical host computers using the set of tasks following the migration strategy, wherein the set of processors that operates to:

monitor application performance metrics for at least one of the set of applications or applications in a plurality of clouds, and wherein the set of application performance metrics identified after migrating the set of containers is used as a feedback to a machine learning model comprising a machine learning algorithm to adjust the migration strategy for a creation of future tasks for migrating containers for the set of applications.

9. The container management system of claim 8, wherein the set of processors that operates to:

determine a pattern for set of application performance metrics in an application performance metric history;

wherein in creating the set of tasks to move the set of containers for the set of applications identified for the migration from the set of current physical host computers to the set of target physical host computers using the set of application performance metrics, the set of processors that operates to:

create the set of tasks following the migration strategy to move the set of containers for the set of applications identified for the migration from the set of current physical host computers to the set of target physical host computers using the pattern for the set of application performance metrics identified in the application performance metric history, wherein application level performance is increased by using the set of tasks following the migration strategy to move the set of containers.

10. The container management system of claim 8, wherein the migration strategy comprises:

a schedule for the set of tasks, wherein the schedule takes into account at least one of an execution priority, a time slot for the set of applications, or a cloud management rule.

11. The container management system of claim 8, wherein identifying the set of containers for the set of applications for a migration using the set of application performance metrics, the set of processors that operates to:

identify a set of performance limitations for the set of applications based on the set of application performance metrics; and identify the set of containers for the set of applications causing the set of performance limitations for the set of applications.

12. The container management system of claim 8, wherein in creating the set of tasks following the migration strategy to move the set of containers for the set of applications identified for the migration from the set of current physical host computers to the set of target physical host computers using the set of application performance metrics, the set of processors that operates to:

create the set of tasks following the migration strategy to move the set of containers for the set of applications identified for the migration from the set of current physical host computers to the set of target physical host computers using the set of application performance metrics and a set of migration rules.

13. The container management system of claim 8, wherein in identifying the set of containers for the set of applications for the migration using the set of application performance metrics, the set of processors that operates to:

identify a set of initial containers for the set of applications for the migration using the set of application performance metrics; and identify a number of additional containers having dependencies to the set of initial containers for the set of applications, wherein the set of initial containers and the number of additional containers form the set of containers for the set of applications.

14. The container management system of claim 8, wherein the set of current physical host computers are located in a first cloud in a multi-cloud computing environment comprising the plurality of clouds and the set of target physical host computers are in a second cloud in the multi-cloud.

15. A computer program product for automatic container migration, the computer program product comprising:

a computer-readable storage media;

first program code, stored on the computer-readable storage media, executable by a set of processors to cause the set of processors to identify a set of containers for a set of applications for a migration using a set of application performance metrics;

second program code, stored on the computer-readable storage media, executable by the set of processors to cause the set of processors to create a set of tasks following a migration strategy to move the set of containers for the set of applications identified for the migration from a set of current physical host computers to a set of target physical host computers using the set of application performance metrics; and third program code, stored on the computer-readable storage media, executable by the set of processors to cause the set of processors to move the set of containers for the set of applications from the set of current physical host computers to the set of target physical host computers using the set of tasks following the migration strategy, wherein the set of processors that operates to:

monitor application performance metrics for at least one of the set of applications or applications in a plurality of clouds, and wherein the set of application performance metrics identified after migrating the set of containers is used as a feedback to a machine learning model comprising a machine learning algorithm to adjust the migration strategy for a creation of future tasks for migrating containers for the set of applications.

16. The computer program product of claim 15 further comprising:

fourth program code, stored on the computer-readable storage media, executable by the set of processors to cause the set of processors to determine a pattern for set of application performance metrics in an application performance metric history;

wherein the second program code comprises:

program code, stored on the computer-readable storage media, executable by the set of processors to cause the set of processors create the set of tasks following the migration strategy to move the set of containers for the set of applications identified for the migration from the set of current physical host computers to the set of target physical host computers using the pattern for the set of application performance metrics identified in the application performance metric history, wherein application level performance is increased by using the set of tasks following the migration strategy to move the set of containers.

17. The computer program product of claim 15, wherein the migration strategy comprises:
a schedule for the set of tasks, wherein the schedule takes into account at least one of an execution priority, a time slot for the set of applications, or a cloud management rule.

18. The computer program product of claim 15, wherein identifying the set of containers for the set of applications for a migration using the set of application performance metrics, the set of processors that operates to:
identify a set of performance limitations for the set of applications based on the set of application performance metrics; and
identify the set of containers for the set of applications causing the set of performance limitations for the set of applications.

19. The computer program product of claim 15, wherein in creating the set of tasks following the migration strategy to move the set of containers for the set of applications identified for the migration from the set of current physical host computers to the set of target physical host computers using the set of application performance metrics, the set of processors that operates to:
create the set of tasks following the migration strategy to move the set of containers for the set of applications identified for the migration from the set of current physical host computers to the set of target physical host computers using the set of application performance metrics and a set of migration rules.

20. The computer program product of claim 15, wherein in identifying the set of containers for the set of applications for the migration using the set of application performance metrics, the set of processors that operates to:
identify a set of initial containers for the set of applications for the migration using the set of application performance metrics; and
identify a number of additional containers having dependencies to the set of initial containers for the set of applications, wherein the set of initial containers and the number of additional containers form the set of containers for the set of applications.

21. The computer program product of claim 15, wherein the set of current physical host computers are located in a first cloud in a multi-cloud computing environment comprising the plurality of clouds and the set of target physical host computers are in a second cloud in the multi-cloud.

* * * * *